Oct. 13, 1953  DE WITT C. CLINTSMAN  2,655,056
AUTOMATIC INFINITELY VARIABLE POWER TRANSMISSION
Filed Jan. 31, 1952  7 Sheets-Sheet 1

INVENTOR
DEWITT C. CLINTSMAN
BY Gustave Miller
ATTORNEY

Oct. 13, 1953 DE WITT C. CLINTSMAN 2,655,056
AUTOMATIC INFINITELY VARIABLE POWER TRANSMISSION
Filed Jan. 31, 1952 7 Sheets-Sheet 2

INVENTOR
DEWITT C. CLINTSMAN
BY Gustave Miller
ATTORNEY

Oct. 13, 1953  DE WITT C. CLINTSMAN  2,655,056
AUTOMATIC INFINITELY VARIABLE POWER TRANSMISSION
Filed Jan. 31, 1952  7 Sheets-Sheet 6

INVENTOR
DEWITT C. CLINTSMAN
BY Gustave Miller
ATTORNEY

Oct. 13, 1953    DE WITT C. CLINTSMAN    2,655,056
AUTOMATIC INFINITELY VARIABLE POWER TRANSMISSION
Filed Jan. 31, 1952    7 Sheets-Sheet 7

INVENTOR
DEWITT C. CLINTSMAN
BY *Gustave Miller*
ATTORNEY

Patented Oct. 13, 1953

2,655,056

UNITED STATES PATENT OFFICE 2,655,056

AUTOMATIC INFINITELY VARIABLE POWER TRANSMISSION

De Witt C. Clintsman, Watertown, N. Y.

Application January 31, 1952, Serial No. 269,283

12 Claims. (Cl. 74—752)

1

This invention relates to an automatic infinitely variable power transmission particularly adaptable to automobiles, other vehicles, and elsewhere where needed.

An object of this invention is to provide an automatic infinitely variable power transmission having many favorable features, including exclusively gear drive and a ratio graduation which is fully continuous throughout. This transmission uses no friction devices for either driving or controlling, and there is no loss in the transmission of power. It provides quick and strong take-off and pick-up, and will not heat up.

A further object of this invention is to provide an automatic transmission wherein all adjustments are extremely simple and readily accessible, and wherein the only shift necessary is when changing from a forward speed direction, to a neutral position, to a reverse speed direction, and vice versa, no shifting to any low or power range is necessary, and this transmission automatically provides whatever power is necessary at every speed.

A further feature of this invention is that any good oil may be used in the transmission mechanism, needing no frequent or periodical adjustments.

A further object of this invention is to provide an automatic transmission wherein the engine-to-rear ratio may be one ratio in a forward speed and a different ratio in a reverse speed, the gear ratio as herein disclosed being a 2 to 1 ratio in the forward speed and a 1 to 1 ratio in the reverse speed.

A further object of this invention is to provide a governor which is particularly useful in this automatic transmission in that it occupies a minimum of axial space on its shaft.

With the foregoing and other objects in view, this invention comprises the combination, construction and arrangement of parts hereinafter set forth, claimed and disclosed in the accompanying drawings, wherein:

2

This invention comprises a variable ratio power transmission 10 particularly adaptable to automobiles, wherein the forward motion is obtained by driving a differential spider 11 and its pinion gears 12 while controlling the rotation of one differential side gear 14 and wherein reverse direction is obtained by shifting the drive to said side gear 14 while controlling the rotation of the spider 11.

Gear control is obtained by controlling the movement of a "differentiator" unit 15 with crankshaft 16 and reciprocating pistons 17. This unit 15 lies submerged in oil in a horizontal position close to the bottom of the housing 18. Power is received equally by the differentiator 15 and the rear or driven differential side gear 19. Each is driven in proportion to the difference in their resistances. With the differentiator cylinders 20 fully open it is freely driven. As the cylinders become closed the rear differential side gear 19 becomes driven in proportion to the volume of oil allowed to escape from the cylinders 20. The escape of oil is governed by the balance between power and the speed of the driven side gear 19 until when the differentiator 15 is held motionless, the side gear 19 is driven at a 2 to 1 ratio in forward and a 1 to 1 ratio in reverse. On deceleration, the engine opposes car momentum by a 1 to 2 ratio as the driven side gear 19 becomes the driver, the front side gear 14 remains held and the engine is driven through the spider gears 12. Likewise, the same action and ratio applies in case of pushing or towing the car to start the engine.

Figure 1:
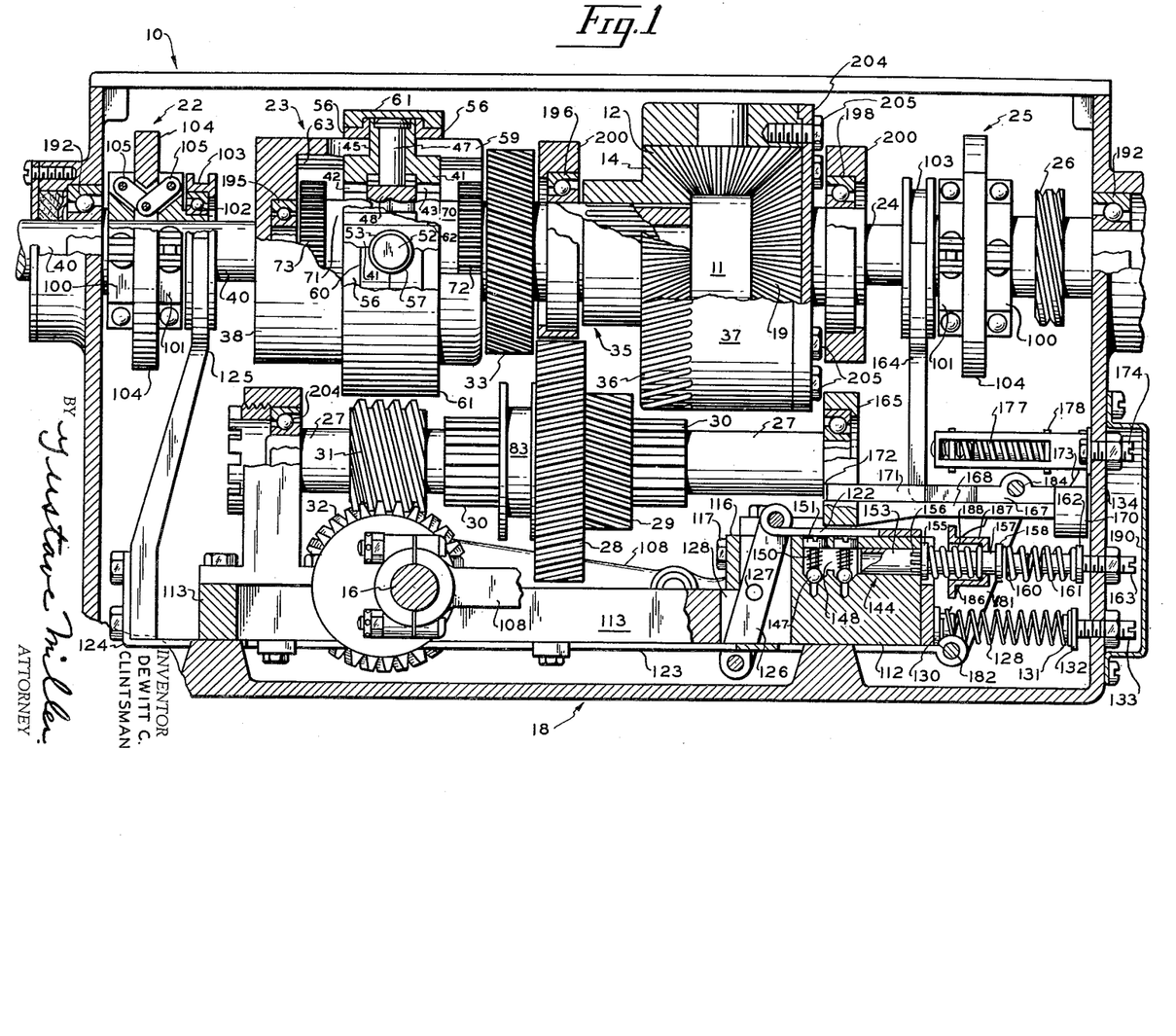
Fig. 1 is an elevational view of the working parts, except for the gear shift, looking at the left side thereof.
Figure 4:
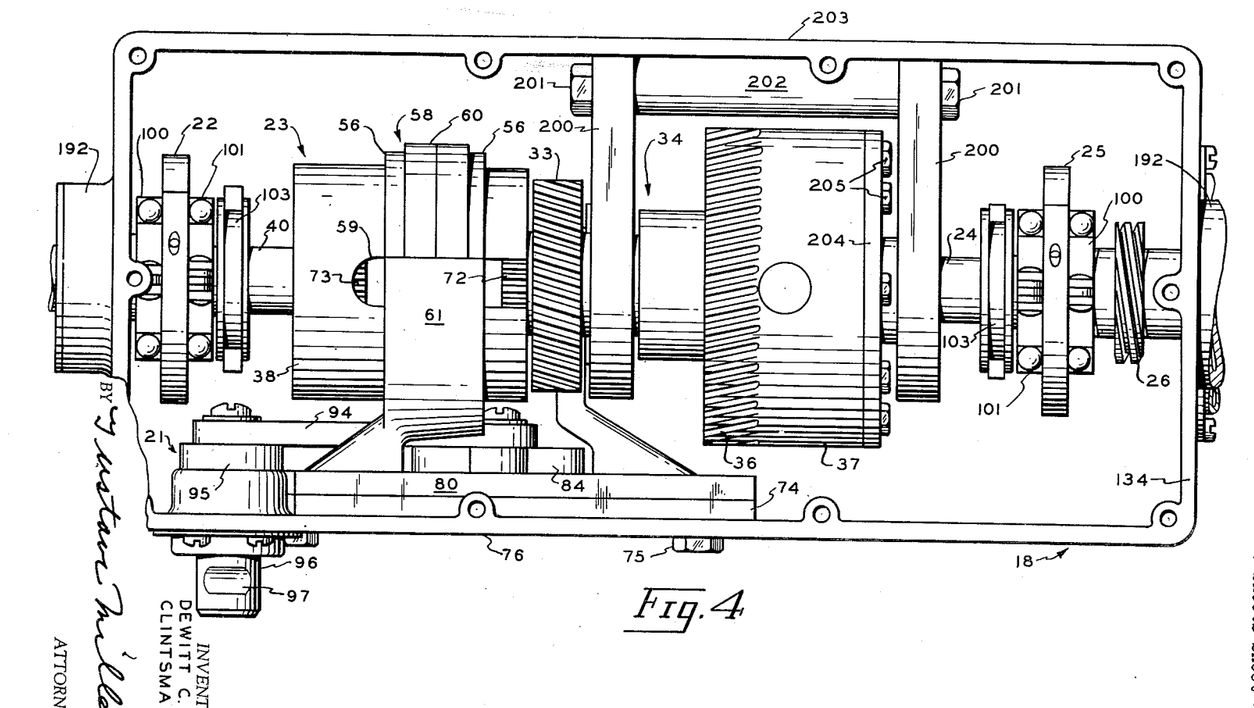
Fig. 4 is a top plan view of the gear shift and drive transmitting mechanism, the differentiator mechanism being omitted for clarity.
Figure 11:
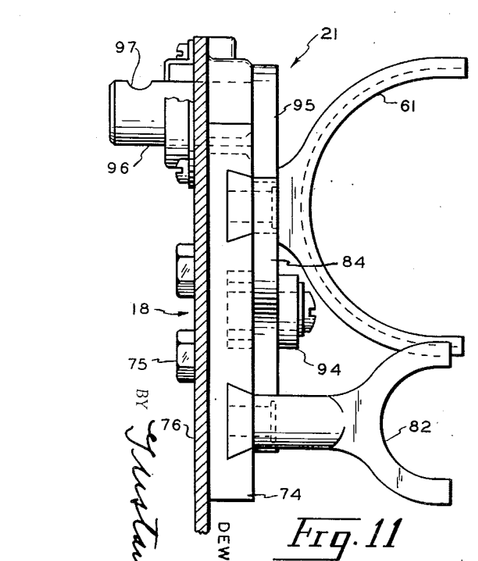
Fig. 11 is an end elevation of the shifting mechanism.
Figure 12:
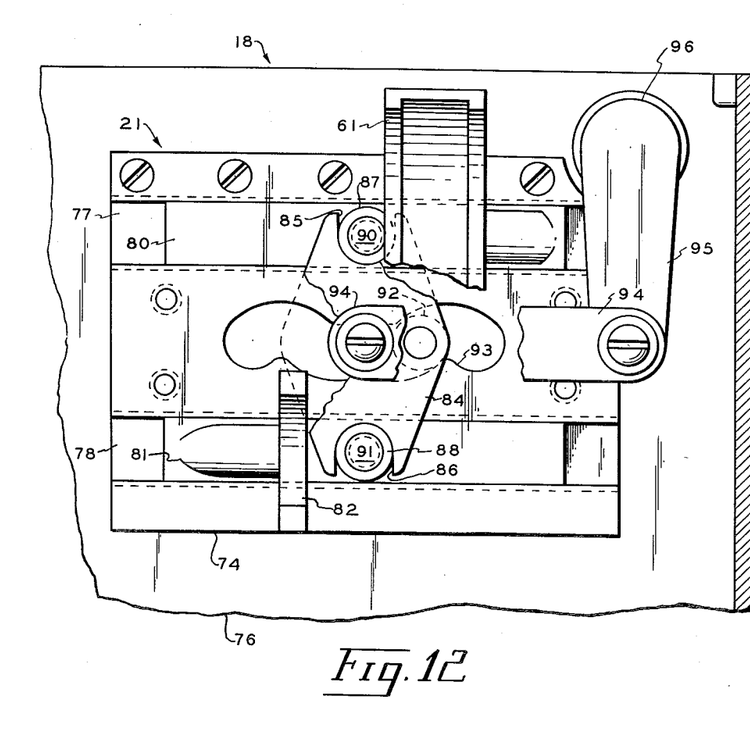
Fig. 12 is a side elevation of the shifting mechanism.

Fig. 1 shows the left side elevation of all the working parts excepting the direction shifting mechanism 21 shown in Figs. 4, 11 and 12 and the cylinder and piston assemblies of the differentiator 15. The main shaft 40 assemblies from left to right or forward to rear are: 1st. The driving shaft centrifugal governor 22. 2nd. The drive engaging mechanism 23. 3rd. The front side gear assembly 34, shown in Fig. 8. 4th. The spider assembly 35, shown in Fig. 7. 5th. The driven side gear assembly which includes the driven shaft 24 on which the driven side gear 19 is affixed, the centrifugal governor 25 and the speedometer gear 26.

Figures 13, 14:
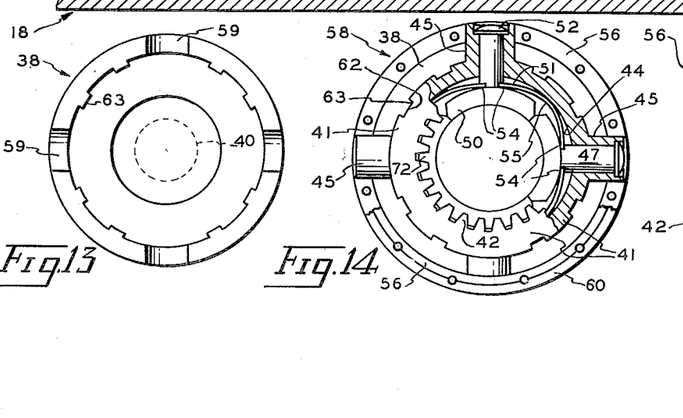
Fig. 13 is a rear end elevation of the driving ring.
Fig. 14 is a rear end elevation partly in section of the driving unit.
Figure 15:
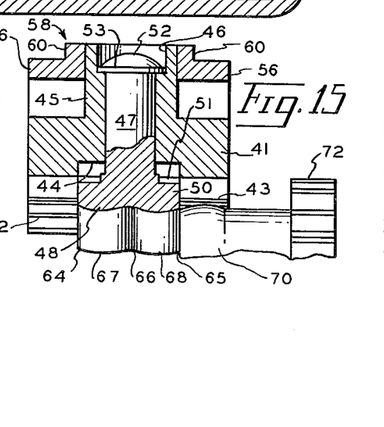
Fig. 15 is a somewhat enlarged fragmentary sectional view of some of the driving unit details and their cooperation with the gear hub of the front side gear assembly.

Returning to Fig. 1, a countershaft 27 carries a double gear 28 and 29 which is slidable on splines 30 and a worm gear 31 which engages the gear 32 at the center of the differentiator crankshaft 16. When the double gear 28 and 29 is slid forward, gear 28 engages its mate 33 on the front side gear assembly 34, thus connecting the side gear 14 to the differentiator 15. At the same time the drive engaging unit 23 is slid forward to engage the spider assembly 35. When the double gear 28 and 29 is slid backward, gear 29 engages teeth 36 in the outer periphery of the spider ring 37 engaging the spider 11 to the differentiator 15. At the same time the drive engaging unit 23 engages the side gear assembly 34 for reverse. In the neutral position shown, nothing is driven beyond the drive engaging unit 23. An end view of this unit 23 is shown in Fig. 14. It is carried and driven by the driver 38 shown in end view in Fig. 13, in partially broken away section in Fig. 1 and in the plan view in Fig. 4. This driver 38 is integral with the driving or power shaft 40. The drive engaging unit 23 consists of a ring 41 with teeth 42 and 43 around its internal diameter at both sides of a channel 44 in its center as shown in the enlarged view in Fig. 15. Four integral round projections 45 extend radially outward from its outer diameter at ninety degrees spacings. Counterbored holes 46 extend through the centers of these projections 45 to receive shanks 47 of four bronze segments 48, the sides 50 of which fit into the inner channel 44 of the ring 41.

In assembling, the segments 48 are pressed outward against flat springs 51 between their radii and the bottom of the channel 44 while the end 52 of each shank 47 is peened over a washer 53 which rests on the bore shoulder in the holes 46. Each spring 51 reaches from shank 47 to shank 47 of adjacent segments 48 and bears inward against the radii of the segments 48 at its ends 54 and against the bottom of the channel 44 at its center 55, thus holding the segments 48 firmly inward. Two rings 56 each with four semi-circular millings 57 corresponding to the projections 45 on the toothed ring 41 are riveted firmly about the projections 45. The internal diameter of the ring 58 thus formed is correctly spaced from the outer diameter of the toothed ring 41 to receive the driver 38 with the projections 45 passing through its slots 59. This ring 58 has a step 60 which forms a larger outer diameter at its center than at its sides to receive a channeled shifting yoke 61. The toothed ring 41 has splines 62 in its outer diameter to receive splines 63 on the internal diameter of the driver 38. As shown in the enlarged drawing in Fig. 15, the bronze segments 48 have varying radii, being larger at the sides 64 and 65 and center 66 and smaller midway between at 67 and 68. The gear hubs 70 and 71 which the segments engage are correspondingly shaped. Thus, at the beginning of the engaging movement the segments 48 are forced outward against the spring tension at 51 as they slide onto the gear hub 70 or 71. This puts the driven parts into motion. As the segments 48 pass the high point 67 or 68 in their radii the tension lessens just as the teeth 72 or 73 are about to engage teeth 43 or 42. This allows the teeth 43 and 72 or 42 and 73 to readily align themselves. It should be noted that this is the only friction employed for any purpose at any time and that is light and for only very brief intervals.

The shifting mechanism 21 is shown in the plan view in Fig. 4 and in end and side elevation in Figs. 11 and 12. The base or main plate 74 is bolted at 75 to the left side 76 of the housing 18. Two horizontal channels 77 and 78 in the face of this plate 74 carry two slidable flat bars 80 and 81 with angled edges. Each bar 80 and 81 carries a shifting yoke 61 and 82 made integral. The upper bar 80 carries the channeled yoke 61 which engages the drive engaging unit 23. The lower bar 81 carries the yoke 82 which engages the sliding gear channel 83 of double gear 28 and 29 on the countershaft 27. A perpendicular bar 84 with open U shaped ends 85 and 86 engages rollers 87 and 88 attached to the center 90 and 91 of each sliding bar 80 and 81. This perpendicular bar 84 carries a roller 92 at each side of its center, the rollers 92 running in a generally horizontal but curved channel 93 in the center of the main plate 74. This channel 93 is so designed with opposite curves so that when the perpendicular bar 84 is moved in a general horizontal direction by its center, its lower end 86 first describes an arc about its upper end 85 and as the movement progresses it graduates into an arc movement by the upper end 85 with the lower end 86 as center until the bar 84 is returned to a perpendicular position at the end of the movement. On return movement, the sequence is reversed—the upper flat bar 80 is slid first, then the lower flat bar 81. Thus, in shifting into either direction of drive, the countershaft double gear 28 and 29 is first meshed to the gear 33 or 36 to be controlled, then the drive to spider 11 or gear 14 is engaged. In returning to neutral position, the drive is disengaged first, then the countershaft 27. A horizontal bar 94 connects the center of the perpendicular bar 84 to the lower end of the internal shifting arm 95. This arm 95 is integral with a short horizontal shaft 96 at its upper end which passes out through the upper left front side 76 of the housing 18 where an external arm (not shown) is keyed thereto at 97. A centrifugal governor 22 or 25 is shown in thrown or expanded position in side and end views in Fig. 18 and Fig. 17. These governors 22 and 25 are designed with the object of occupying a minimum of longitudinal space. Each consists of two side plates 100 and 101, one plate 100 a press fit on the shaft 24 or 40 and the other plate 101 a sliding fit. The sliding plate 101 carries a semi-thrust bearing 102 which in turn carries a yoke channel 103. The weights are in the form of quadrants 104 which when in the inward position form a circle or disc. They are joined to the side plates 100 and 101 by links 105 extending diagonally outward. As they are centrifugally thrown outwardly they are carried longitudinally to the length of the links 105 while the sliding plate 101 is carried a like distance from the weights. A pin 106 is pressed into one side of each weight and has a sliding fit in a corresponding hole 107 in the adjacent weight. This holds all weights equidistant from center at all times.

Figure 2:
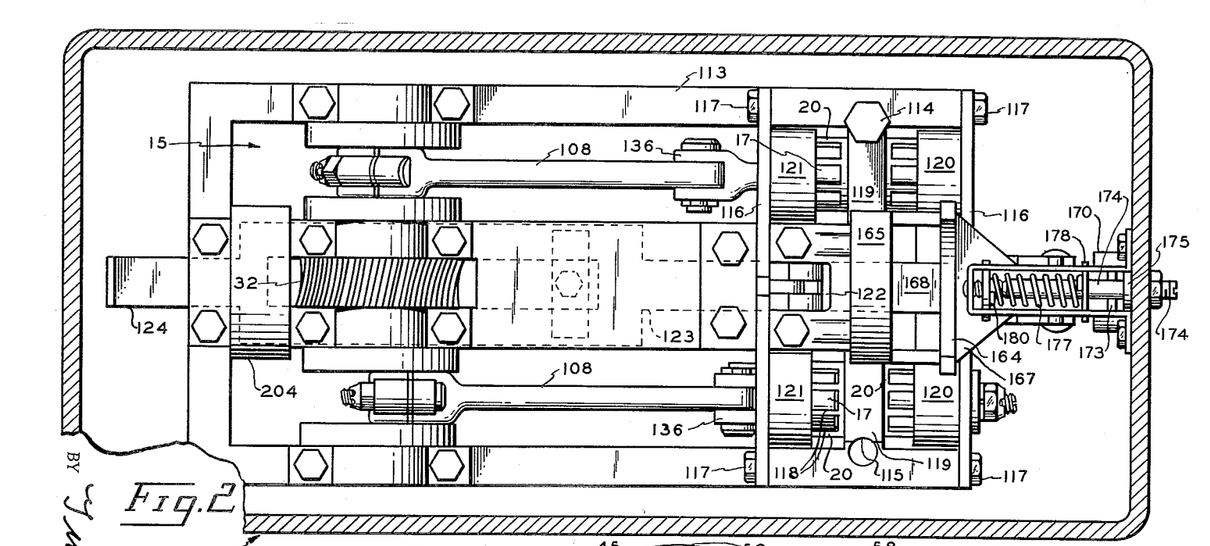
Fig. 2 is a top plan view of the differentiator mechanism in the bottom of the housing.
Figure 3:
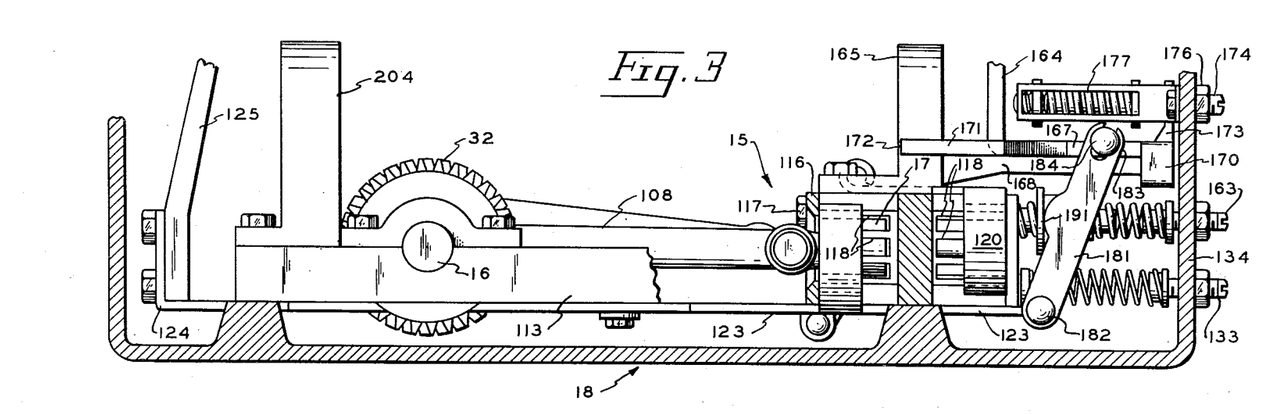
Fig. 3 is a left side elevation partly in section of Fig. 2.

The differentiator 15 is shown in plan view in Fig. 2 and in elevation view in Fig. 3 being located in an oil sump at the bottom of housing 18. Each connecting rod 108 reciprocates a piston rod 110, see Fig. 9, carrying two short pistons 17. The cylinders 20 are tubular in form with a thick dividing wall 111 at the center through which the piston rods 110 pass. The cylinder bodies 20 have a larger outer diameter 119 at their centers for a distance somewhat less than the thickness of the dividing walls 111 and this portion presses into a wall 112 of like thickness in the base block 113. Two of the bolts 114 which secure the block 113 to the bottom of the housing 18 pass somewhat inside of tangent to the large outer diameter 119 of the cylinder bodies 20 where they are grooved at 115 to receive the bolts 114. This holds the cylinders 20 securely in correct position both longitudinally and radially. They are supported at their ends by flat plates 116 which are bolted at 117 to the ends of that portion of the block 113. The cylinders 20 have large rectangular apertures 118 through their walls, the inner ends of the apertures being flush with the dividing wall or head 111 of the cylinder 20. The cylinders 20 carry slidable outer sleeves 120 and 121 which when slid inward against the large outer diameter 119, completely close the apertures 118. When slid outward against the end-supporting plates 116 they fully open the apertures 118. The two rear sleeves 120 are carried integrally with a short, flat bar 122 which slides on the upper surface of the cylinder block 113 midway between the cylinders 20. The two forward sleeves 121 are carried by a similar but long bar 123 which slides underneath the entire length of the differentiator body 15 where its forward end 124 carries the front governor yoke 125. An arm 126 pivoted at its center 127 extends through a slot 128 in the block and connects at its ends to the sliding sleeve bars 122 and 123. Thus, as the front governor 22 is expanded it carries the lower bar 123 and front sleeves 121 backward and the upper bar 122 and rear sleeves 121 forward. The sleeves 121 and 122 are held outward to clear the apertures 118 by a compression coil spring 128 pressing against an upwardly extending lug 130 near the rear end of the lower bar 123. The outer or rear end 131 of this spring 128 bears against the shoulder 132 of an adjusting screw 133 through the rear wall 134 of the housing 18.

Figure 9:
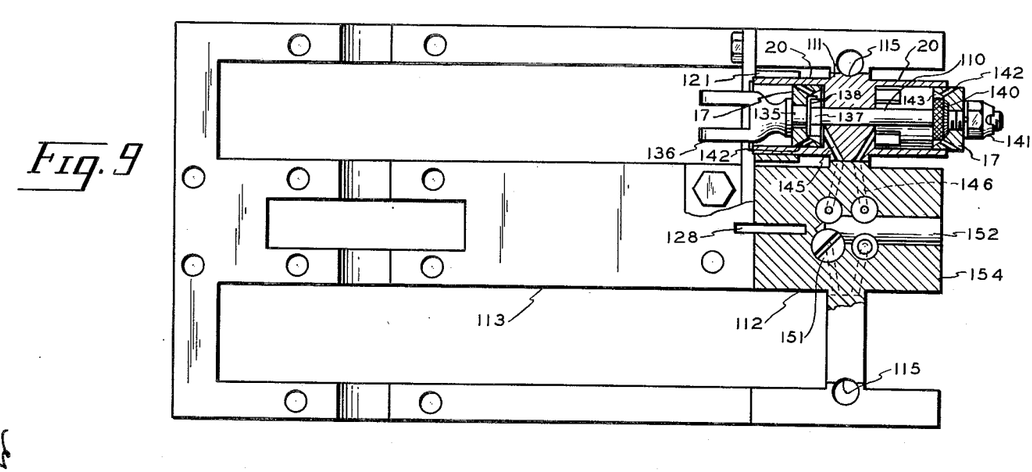
Fig. 9 is a partly cross sectional view of the control piston and cylinder assembly and block for the differentiator mechanism.
Figure 10:
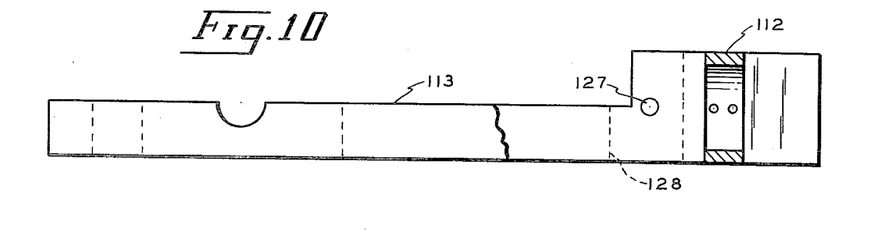
Fig. 10 is a left elevation of Fig. 9.

In Fig. 9 is shown a cross-sectional view of a piston and cylinder pump and valve assembly. The forward pump piston 17 is tightened against a shoulder 135 at the clevised end 136 of the piston rod 110 by a nut 137 and special lock washer 138. The rear pump piston 17 is tightened against a self-locking nut 140 by a castellated nut and lock washer 141. Small holes 142 extend from the inner dish 143 of the pistons 17 diagonally outward through the outer wall close behind the head. As a pump piston 17 reaches the outer end of its stroke these holes 142 reach past the end of the cylinder 20, relieving the vacuum and allowing oil to fill the cylinder 20.

The two crank throws of crankshaft 16 are at a 90 degree angle to each other. Since compression is equal in both directions of reciprocation, this overlaps the compression strokes ½, producing an unfluctuating pressure for controlling the differentiator movement.

The control valve 144 is located in the center of the cylinder supporting blockwall 112. It is shown in elevation in Fig. 1 and in plan view in Fig. 9. A small hole 145 leads diagonally from the head 111 of each cylinder 20 through the side of the dividing wall 112. There they meet like holes 146 in the blockwall 112 and lead to four points in the form of a square where they turn upward past four steel ball check valves 147 into the pressure chamber 148. The four balls 147 are held seated by both gravity and tiny coil springs 150 held in place by screws 151 in the top of the blockwall 112. A hole or cylinder 152 extends horizontally backward from the pressure chamber 148 through the end 154 of the block 112. A piston 153 is inserted into this cylinder 152 to a distance where a shoulder 155 seats against the end 154 of the block 112. This piston 153 is hollow from its inner end to the seating shoulder 155. It has very narrow rectangular apertures 156 through its wall, these apertures 156 being just fully within the cylinder when the shoulder 155 is seated. The shank 157 of the piston 153 extends backward and carries a washer 158 against a stepped portion near its end, forming a second shoulder 160. A compression coil spring 161 presses against this washer 158, the rear end of the spring bearing against a shoulder 162 of an adjusting screw 163 through the rear wall 134 of the housing 18.

Figure 5:
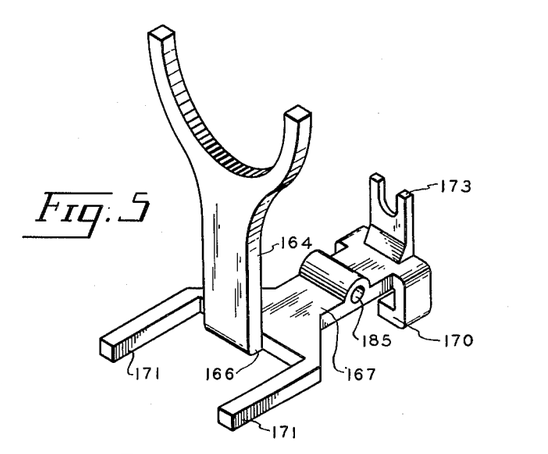
Fig. 5 is a perspective view of the yoke piece for the rear governor.
Figures 6, 7, 8:
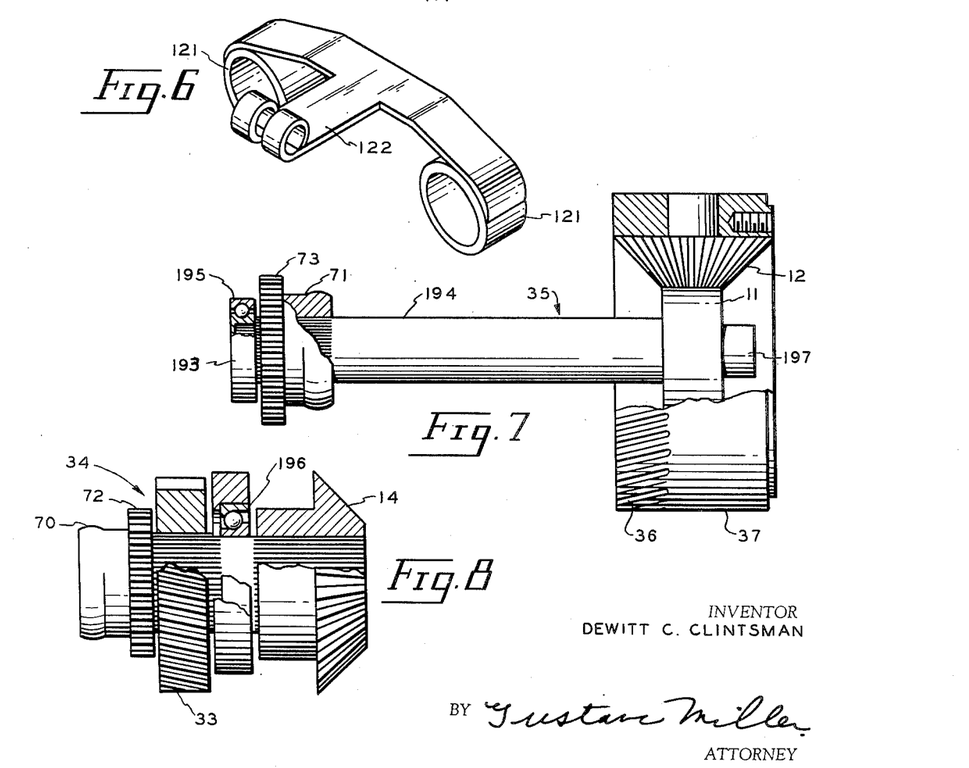
Fig. 6 is a perspective view of the rear sleeves for the control cylinders.
Fig. 7 is a partly sectional view of the spider assembly.
Fig. 8 is a partly sectional view of the front side gear assembly.

The rear governor yoke piece 164 is shown in Fig. 5. The countershaft rear bearing bracket 165 is shown in Figs. 1 and 2. The rear cylinder sleeves piece 122 is shown in Fig. 6. The relation of the yoke piece 164 and bearing bracket 165 is also shown in the greater assemblies on Figs. 1, 2 and 3. The yoke piece 164 forms a right angle 166 extending horizontally backward. The horizontal portion 167 is slidably carried on a flat bed 168 which is an integral extension from the bearing bracket 165. At the rear end of the horizontal portion 167, lateral extensions 170 are formed to fit around the sides and bottom of the bed 168 as a guide. It is further guided by two forward extensions 171 so spaced as to fit grooves 172 in the sides of the bearing bracket 165. The rear end of the yoke piece 164 turns upward to form a small yoke 173 which fits a spring adjusting screw 174. This screw 174 is secured to the rear wall 134 of the housing 18 by a shoulder 175 inside the wall 134 and a nut 176 outside. The screw 174 is encircled by a compression coil spring 177, the rear end of which is in a fixed position 178 a certain distance forward from the rearmost position of the small yoke 173. The forward end 180 of the spring 177 is adjustable for tension. Thus, as the governor carries the yoke piece 164 forward a predetermined distance, the small yoke 173 at its end contacts the spring 177 which then controls its further movement.

A pair of identical arms or levers 181 are pinned at their lower end 182 to each side of the rear end of the lower cylinder sleeve bar 123. The open U-shaped upper ends 183 of these arms 181 engage a pin 184 through a bore 185 in the horizontal portion 167 of the rear governor yoke piece 164. The fulcrum for these arms 181 is the shoulder 186 of a cup or thimble 187 carried slidably on the shank 157 of the control valve piston 153. A compression coil spring 188 encircles the shank 157 from the bottom of the thimble 187 to the seating shoulder 155 of the piston 153. This spring 188 and thimble 187 are forward of and independent of the shoulder 160 formed by the washer 158 which the adjustable spring 161 contacts.

Figures 16, 17, 18:
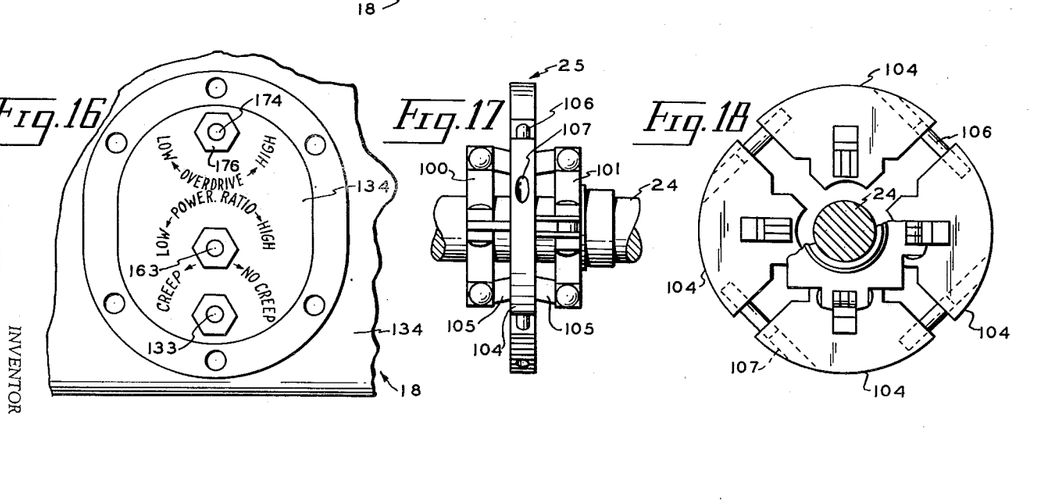
Fig. 16 is an elevational view of the right hand end of Fig. 3 showing the external adjustment.
Fig. 17 is a side view of a centrifugal governor in thrown position.
Fig. 18 is an end view of Fig. 17.

The external adjustments as they appear on the lower rear end wall 134 of the housing 18 are shown with their protective cover 190 removed in Fig. 16.

In operation and adjustment, assume first that the engine is idling and the shifting assembly 21 is in forward drive position. The lower spring 128 which opposes the front governor 22 should be decreased in tension by adjusting screw 133 until the governor 22 slides the cylinder sleeves 120 and 121 inward enough to cause the car to creep slightly. Then the tension of spring 128 should be increased by again adjusting screw 133 just enough to overcome that tendency. With that adjustment, the car will begin to move on very slight acceleration. Upon acceleration for starting, the governor 22 slides the sleeves 120 and 121 to closing position quickly. The pressure thus created forces the control valve piston 153 outward away from its seating shoulder 155 and allows a certain volume of oil to escape through its apertures 156. The volume of escaping oil is determined by the amount of power applied or the pressure thus created and the area of aperture opening. The area of aperture opening is determined by the pressure and the tension of the opposing spring 161. Since this adjustment of spring 161 affects the ratio, under all conditions where much power is required (except at high car speed), repeated trials and adjustments should be made to obtain the most efficient and satisfactory ratios under all conditions.

When engine speed causes the front governor 22 to slide the lower cylinder sleeve bar 123 rearwardly, it carries with it the lower ends 182 of the arms 181 attached to its rear end. This leaves nothing to hold the rear governor 25 from expanding freely. So with the beginning of car movement, the rear governor 25 immediately carries its yoke 164 and the upper ends of those arms 181 forwardly until the humped center 191 of the arms 181 bear against the thimble 187 on the shank 157 of the control valve piston 153. Form there on, increasing car speed adds proportionately to the inward or opposing pressure on the piston 153, thus proportionately raising the ratio. At the same time that the humped centers 191 of the arms 181 reach the thimble shoulder 186, the small yoke 173 at the end of the governor yoke piece 164 reaches its control spring 177. Obviously, the more governor power consumed by spring 177, the less can be exerted on the piston 153. So the tension of spring 177 determines the car speed at which any overdrive ratio is reached with any given power. Likewise, it determines the ratio when car speed is reduced due to insufficient power to maintain a given speed. At high speed, no degree of acceleration can lower the ratio below the full 2 to 1 overdrive. Through all lower ranges of speed, the ratio is controlled as if in a balance between the speed of the car and the power applied. The higher the speed, the higher the ratio at any given degree of acceleration or power. The greater the power, the lower the ratio at any given car speed. Assuming that acclerator position is held constant as the car passes from level road into a steep ascent, engine speed remains constant while car speed reduces through a lowering ratio. Under the same road condition, car speed may be held constant by lowering the ratio with increased acceleration. This graduated balancing action affords extremely quick and powerful pickup and at the same time prevents any excessive engine speed under any driving condition. This action is described in the preceding paragraph. Engine speed varies comparatively little throughout the entire range of road speeds. It is always held well within its range of highest operating efficiency. The only possible exception is if car speed is so excessive that engine speed is high even at the 2 to 1 ratio.

But little car speed is required to start the engine by car momentum. The driven shaft 24 becomes the driving shaft. Pinion gears 12 are engaged to a dead engine. Hence, rear side gear 19 drives front side gear 14 in reverse at a 1 to 1 ratio. As front side gear 14 is driven, so is the differentiator 15. As car speed increases, the rear centrifugal governor 104 carries its yoke 164 and the upper ends of arms 181 forward. With thimble 187 on control valve piston 153 as a fulcrum, the lower ends of arms 181 swing backward against the tension of spring 128. As arms 181 move, so does are 126. This slides sleeves 120 and 121, closing the cylinders 20 and stopping the differentiator 15 and front side gear 14. As side gear 14 is stopped, pinion gears 12 and engine are driven forward at a 1 to 2 ratio.

This transmission has many favorable features. It is exclusively gear drive. Its ratio graduation is continuous throughout. It uses no friction for either driving or controlling. There is no power loss. Its starts and acceleration are quick and strong. At normal road speeds, the differentiator 15, countershaft 27 and front side gear assembly 34 all stand motionless. The car could stand faced against an immovable object such as a concrete wall, the accelerator depressed until the engine is exerting strong driving power and held there indefinitely without subjecting the transmission to any more heat and wear than in normal driving. All adjustments are extremely simple and readily accessible. No low range is required; only forward, reverse and neutral. No special, expensive fluid is required; just good oil. No frequent or periodical adjustments should be required. Since all adjustments affect only spring tensions and the area of oil pressures rather than wearing parts, they should retain their adjustments indefinitely.

The driving and driven shafts are carried in the ends of the housing 18 by semi-thrust ball bearings 192. The forward end 193 of the spider shaft 194, Fig. 7, is carried by a radial ball bearing 195 in the driver 38. The front side gear assembly 34 is carried by a semi-thrust ball bearing 196 which in turn carries the rear end of the spider shaft 194. The extreme rear end 197 of the spider shaft 194 is journaled into the driven side gear 19. The forward end of the driven side gear shaft 24 is carried by a semi-thrust ball bearing 198. This latter bearing 198 and the one 196 carrying the front side gear 14 are carried by brackets 200 bolted at 201 to an inwardly extending projection 202 on the right wall 203 of the housing 18. The countershaft 27 is carried at its front end by a semi-thrust ball bearing 204, the rear end being carried by bearing 165. An apertured flange 204 is bolted at 205 on the spider ring 37 to facilitate assembly.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one of said side gears being fixed on one of said shafts, and shift controlled connector means for selectively connecting either said other side gear or said pinion spider to the other of said shafts, a countershaft in parallel alignment with said driving and driven shafts, a shift controlled gear splined on said countershaft, said pinion ring including a gear means therewith, said other side gear including a gear means therewith, shift means for selectively engaging said splined double gear with either said pinion ring gear means or said other side gear means and simultaneously to operate said connector means, a driving shaft controlled governor, a driven shaft controlled governor, a fluid pump geared to said countershaft, and driving shaft and driven shaft governor controlled means controlling the operation of said pump and thereby, through said crankshaft and gear connection to either said other side gear or said pinion spider, the ratio of the speed of either of said shafts to the other of said shafts.

2. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one of said side gears being on one of said shafts, and shift controlled connector means for selectively connecting either said other side gear or said pinion spider to the other of said shafts, a countershaft in parallel alignment with said driving and driven shafts, a shift controlled double gear splined on said countershaft, said pinion ring including a gear means therewith, said other side gear including a gear means therewith, shift means for selectively engaging said splined double gear with either said pinion ring gear means or said other side gear means and simultaneously to operate said connector means, a driving shaft controlled governor, a driven shaft controlled governor, a fluid pump geared to said countershaft, and driving shaft and driven shaft governor controlled fluid ingress and exit means controlling the operation of said pump and thereby, through said crankshaft and gear connection to either said other side gear or said pinion spider, the ratio of the speed of either of said shafts to the other of said shafts.

3. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one of said side gears being fixed on one of said shafts, and shift controlled connector means for selectively connecting either said other side gear or said pinion spider to the other of said shafts, a countershaft in parallel alignment with said driving and driven shafts, a shift controlled gear splined on said countershaft, said pinion ring including a gear means therewith, said other side gear including a gear means therewith, shift means for selectively engaging said splined double gear with either said pinion ring gear means or said other side gear means sequentially with its operation of said connector means, a driving shaft controlled governor, a driven shaft controlled governor, a fluid pump geared to said countershaft, and driving shaft and driven shaft governor controlled means controlling the operation of said pump and thereby, through said crankshaft and gear connection to either said other side gear or said pinion spider, the ratio of the speed of either of said shafts to the other of said shafts, said fluid pump comprising a crankshaft geared to said countershaft, piston means operable by said crankshaft, cylinder means for said piston means, the sides of said cylinder means being open for free ingress of fluid therein, said governor controlled means including closure means for said open cylinder sides, and yieldably controlled valve means connected to said cylinder means controlling the escape of fluid from said cylinder means.

4. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one of said side gears being on one of said shafts, and shift controlled connector means for selectively connecting either said other side gear or said pinion spider to the other of said shafts, a countershaft in parallel alignment with said driving and driven shafts, a shift controlled double gear splined on said countershaft, said pinion ring including a gear means therewith, said other side gear including a gear means therewith, shift means for selectively engaging said splined double gear with either said pinion ring gear means or said other side gear means sequentially with its operation of said connection means, a driving shaft controlled governor, a driven shaft controlled governor, a fluid pump geared to said countershaft, and driving shaft and driven shaft governor controlled fluid ingress and exit means controlling the operation of said pump and thereby, through said crankshaft and gear connection to either said other side gear or said pinion spider, the ratio of the speed of either of said shafts to the other of said shafts, said fluid pump comprising a crankshaft geared to said countershaft, piston means operable by said crankshaft, cylinder means for said piston means, the sides of said cylinder means being open for free ingress of fluid therein said governor controlled fluid ingress and exit means including closure means for said open cylinder sides, and adjustably controlled yieldable valve means connected to said cylinder means controlling the escape of fluid from said cylinder means.

5. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one side gear being affixed on said driven shaft, and shift controlled connector means for selectively connecting either said other side gear or said pinion spider to said driving shaft, a countershaft in parallel alignment with said driving and driven shafts, a shift controlled gear splined on said countershaft, said pinion ring including a gear means therewith, said other side gear including a gear means therewith, shift means for selectively meshing said splined gear with either said pinion ring gear means or said other side gear means sequentially with its operation of said connector means, a driving shaft controlled governor, a driven shaft controlled governor, a fluid pump geared to said countershaft, and driving shaft and driven shaft governor controlled fluid ingress and exit means controlling the operation of said pump and thereby, through said crankshaft and gear connection to either said other side gear or said pinion spider, the ratio of the speed of either of said shafts to the other of said shafts.

6. An infinitely variable ratio power transmission including a driving shaft and a driven shaft spaced apart in axial alignment, a differential gear mechanism therebetween in said axial alignment, said differential mechanism having a pair of oppositely disposed side gears and pinion gears in mesh therewith journaled on a pinion spider which in turn is journaled within a pinion ring, one side gear being affixed on said driven shaft, and shift controlled connector means for selectively connecting either said other side gear or said pinion spider to said driving shaft, a countershaft in parallel alignment with said driving and driven shafts, a shift controlled gear splined on said countershaft, said pinion ring including a gear means therewith, said other side gear including a gear means therewith, shift means for selectively meshing said splined gear with either said pinion ring gear means or said other side gear means sequentially with its operation of said connector means, a driving shaft controlled governor, a driven shaft controlled governor, a fluid pump geared to said countershaft, and driving shaft and driven shaft governor controlled fluid ingress and exit means controlling the operation of said pump and thereby, through said crankshaft and gear connection to either said other side gear or said pinion spider, the ratio of the speed of either of said shafts to the other of said shafts, said fluid pump comprising a crankshaft geared to said countershaft, a pair of pistons operable by said crankshaft, a cylinder for each of said pistons, the sides of said cylinders being open for free ingress of fluid therein, said governor controlled fluid ingress and exit means including sleeve closure means for said open cylinder sides, and yieldably controlled valve means connected to said cylinders controlling the escape of fluid from said cylinder means.

7. An infinitely variable ratio power transmission including a driving shaft and a driven shaft spaced apart in axial alignment, a differential gear mechanism therebetween in said axial alignment, said differential gear mechanism having a pair of oppositely disposed side gears and pinion gears in mesh therewith journaled on a pinion spider which in turn is journaled within a pinion ring, one of said side gears being affixed on said driven shaft, and shift controlled connector means for selectively connecting either said other side gear or said pinion spider to said driving shaft, a countershaft in parallel alignment with said driving and driven shafts, a shift controlled double gear splined on said countershaft, said pinion ring including a gear means therewith, said other side gear including a gear means therewith, shift means for selectively meshing said splined double gear with either said pinion ring gear means or said other side gear means prior to its operation of said connector means, and disengaging said splined double gear subsequent to disconnecting said connector means, a driving shaft controlled governor, a driven shaft controlled governor, a piston and cylinder fluid pump geared to said countershaft, and driving shaft and driven shaft governor controlled fluid ingress and egress means controlling the operation of said pump and thereby, through said crankshaft and gear connection to either said other side gear or said pinion spider, the ratio of the speed of either of said shafts to the other of said shafts.

8. An infinitely variable ratio power transmission including a driving shaft and a driven shaft spaced apart in axial alignment, a differential gear mechanism therebetween in said axial alignment, said differential gear mechanism having a pair of oppositely disposed side gears and pinion gears in mesh therewith journaled in a pinion spider which in turn is journaled within a pinion ring, one of said side gears being affixed on said driven shaft, and shift controlled connector means for selectively connecting either said other side gear or said pinion spider to said driving shaft, a countershaft in parallel alignment with said driving and driven shafts, a shift controlled double gear splined on said countershaft, said pinion ring including a gear means therewith, said other side gear including a gear means therewith, shift means for selectively meshing said splined double gear with either said pinion ring gear means or said other side gear means prior to its operation of said connector means, and disengaging said splined double gear subsequent to disconnecting said connector means, a driving shaft controlled governor, a driven shaft controlled governor, a piston and cylinder fluid pump geared to said countershaft, and driving shaft and driven shaft governor controlled fluid ingress and egress means controlling the operation of said pump and thereby, through said crankshaft and gear connection to either said other side gear or said pinion spider, the ratio of the speed of either of said shafts to the other of said shafts, said fluid pump comprising a crankshaft geared to said countershaft, a pair of pistons and connecting rods operable by said crankshaft, a cylinder for said piston, the sides of said cylinder means being open for free ingress of fluid therein, said governor controlled fluid ingress and egress means including sleeve closure means for said open cylinder sides, and adjustably controlled yieldable valve means connected to said cylinders controlling the escape of fluid from said cylinder means.

9. The structure defined in claim 1, said shift controlled connector means comprising an internally splined cup-shaped member fixedly secured on said other shaft, said cup member having a plurality of circumferentially spaced slots extending axially therein from its open end, an externally splined ring member complementary to the internal splines of said cup member axially slidable therewithin, means projecting from said ring member through said plurality of slots cooperating with said shift means for positioning said ring, internal gear means provided in said ring member, a pair of gear members within said cup member, one on each side of said ring member, to mesh said ring member internal gear means, one gear member being secured to said other side gear, the other gear member being secured to said spider, whereby axial shifting of said ring member will mesh it to one of the other of said gear members.

10. The structure defined in claim 1, said shift controlled connector means comprising an internally splined cup-shaped member fixedly secured on said other shaft, said cup member having a plurality of circumferentially spaced slots extending axially therein from its open end, an externally splined ring member complementary to the internal splines of said cup member axially slidable therewithin, means projecting from said ring member through said plurality of slots cooperating with said shift means for positioning said ring, internal gear means provided in said ring member, a pair of gear members within said cup member, one on each side of said ring member, to mesh said ring member internal gear means, one gear member being secured to said other side gear, the other gear member being secured to said spider, whereby axial shifting of said ring member will mesh it to one of the other of said gear members, a separate hub for each gear member, and means within said ring member frictionally engaging either hub member as it is moved axially to thereby align its gear member with said ring member gear means.

11. The structure defined in claim 1, said shift controlled connector means comprising an internally splined cup-shaped member fixedly secured on said other shaft, said cup member having a plurality of circumferentially spaced slots extending axially therein from its open end, an externally splined ring member complementary to the internal splines of said cup member axially slidable therewithin, means projecting from said ring member through said plurality of slots cooperating with said shift means for positioning said ring, internal gear means provided in said ring member, a pair of gear members within said cup member, one on each side of said ring member, to mesh said ring member internal gear means, one gear member being secured to said other side gear, the other gear member being secured to said spider, whereby axial shifting of said ring member will mesh it to one of the other of said gear members, a separate hub for each gear member, and means within said ring member frictionally engaging either hub member as it is moved axially to thereby align its gear member with said ring member gear means, said frictional engaging means comprising a plurality of yieldably mounted hub engaging members carried by said ring member.

12. The structure defined in claim 1, said shift means comprising a cammed trackway intermediate a pair of shift trackways, a connector member carried in one shift trackway for said splined gear, a connector member carried in the other shift trackway for said shift controlled connector means, an H-bar having its open ends pivotally connected to said connector members and provided along its center bar with cammed trackway engaging means, and a shift arm pivotally connected to said H-bar at the center thereof for moving said H-bar along its cammed trackway to move said connector members as provided by said cammed trackway.

DE WITT C. CLINTSMAN.

References Cited in the file of this patent

UNITED STATES PATENTS

| Number | Name | Date |
|---|---|---|
| 555,438 | Dow | Feb. 25, 1896 |
| 1,548,666 | Dickinson | Aug. 4, 1925 |
| 1,957,578 | Cook | May 8, 1934 |
| 1,990,212 | Toncich | Feb. 5, 1935 |
| 2,135,908 | Millican | Nov. 8, 1938 |
| 2,186,108 | Holloway | Jan. 9, 1940 |
| 2,191,907 | Fillippis | Feb. 27, 1940 |
| 2,278,351 | Havens | Mar. 31, 1941 |
| 2,311,691 | Porter | Feb. 23, 1943 |
| 2,533,126 | Looney | Dec. 5, 1950 |
| 2,553,126 | Bailey | May 15, 1951 |

FOREIGN PATENTS

| Number | Country | Date |
|---|---|---|
| 472,385 | France | Dec. 3, 1914 |